(12) United States Patent
Tian et al.

(10) Patent No.: US 12,304,352 B2
(45) Date of Patent: May 20, 2025

(54) ELECTRIC VEHICLE THERMAL MANAGEMENT SYSTEM, BATTERY THERMAL MANAGEMENT METHOD AND ELECTRIC VEHICLE

(71) Applicant: Microvast Power Systems Co., Ltd., Huzhou (CN)

(72) Inventors: Yanfeng Tian, Huzhou (CN); Bin Li, Huzhou (CN); Shengxian Wu, Huzhou (CN); Wenjuan Liu Mattis, Longwood, FL (US); Yang Wu, Honolulu, HI (US)

(73) Assignee: MICROVAST INC., Stafford, TX (US)

( * ) Notice: Subject to any disclaimer, the term of this patent is extended or adjusted under 35 U.S.C. 154(b) by 461 days.

(21) Appl. No.: 17/780,023

(22) PCT Filed: Dec. 3, 2019

(86) PCT No.: PCT/CN2019/122551
§ 371 (c)(1),
(2) Date: May 26, 2022

(87) PCT Pub. No.: WO2021/108973
PCT Pub. Date: Jun. 10, 2021

(65) Prior Publication Data
US 2022/0410763 A1    Dec. 29, 2022

(51) Int. Cl.
*B60L 58/24*    (2019.01)
*H01M 10/613*    (2014.01)
(Continued)

(52) U.S. Cl.
CPC ........... *B60L 58/24* (2019.02); *H01M 10/613* (2015.04); *H01M 10/615* (2015.04);
(Continued)

(58) Field of Classification Search
CPC .... B60L 58/24; B60L 2240/545; B60L 58/26; B60L 3/0046; B60L 58/27;
(Continued)

(56) References Cited

U.S. PATENT DOCUMENTS

| 8,915,091 B2 * | 12/2014 | Goenka | B60H 1/2221 62/3.3 |
| 2014/0070013 A1 * | 3/2014 | Stanek | B60L 1/003 237/28 |

(Continued)

FOREIGN PATENT DOCUMENTS

| CN | 203134927 U | 8/2013 | |
| CN | 103972607 A * | 8/2014 | ......... B60H 1/00278 |

(Continued)

OTHER PUBLICATIONS

The extended European search report of EP application No. 19954919.7 issued on Sep. 28, 2023.
(Continued)

*Primary Examiner* — Kun Kai Ma
(74) *Attorney, Agent, or Firm* — Andrew C. Cheng

(57) ABSTRACT

Disclosed are an electric vehicle thermal management system, a battery thermal management method and an electric vehicle. The electric vehicle thermal management system comprises a first loop, a second loop, a first temperature control mechanism, a second temperature control mechanism, a conveying mechanism and a release mechanism, wherein the first loop transmits a first heat conducting agent; a battery and the first temperature control mechanism are respectively connected to the first loop; the second loop transmits a second heat conducting agent; the second temperature control mechanism and a driving motor are respectively connected to the second loop; the conveying mechanism is respectively connected to the first loop and the second loop; and the release mechanism is connected to the
(Continued)

first loop, such that a battery fire disaster is effectively prevented from occurring, and the safety of the vehicle is improved.

17 Claims, 2 Drawing Sheets

(51) Int. Cl.
*H01M 10/615* (2014.01)
*H01M 10/625* (2014.01)
*H01M 10/6556* (2014.01)
*H01M 10/6568* (2014.01)

(52) U.S. Cl.
CPC ..... *H01M 10/625* (2015.04); *H01M 10/6556* (2015.04); *H01M 10/6568* (2015.04); *H01M 2220/20* (2013.01)

(58) Field of Classification Search
CPC ............. H01M 10/613; H01M 10/615; H01M 10/625; H01M 10/6556; H01M 10/6568; H01M 2220/20; H01M 10/63; B60K 1/00; B60K 11/02; B60Y 2200/91; B60Y 2306/05; B60Y 2400/112
See application file for complete search history.

(56) References Cited

U.S. PATENT DOCUMENTS

| | | | |
|---|---|---|---|
| 2014/0193683 A1 | 7/2014 | Mardall | |
| 2016/0318370 A1* | 11/2016 | Rawlinson | ......... B60H 1/32281 |
| 2017/0106724 A1* | 4/2017 | Porras | ................... H01M 10/44 |
| 2017/0214008 A9 | 7/2017 | Mardall | |
| 2018/0289996 A1 | 10/2018 | Kim | |
| 2019/0077393 A1 | 3/2019 | Claccio | |
| 2019/0097288 A1 | 3/2019 | Oh | |

FOREIGN PATENT DOCUMENTS

| | | | | | |
|---|---|---|---|---|---|
| CN | 105720318 | A | | 6/2016 | |
| CN | 106335387 | A * | | 1/2017 | ......... B60H 1/00278 |
| CN | 107323285 | A | | 11/2017 | |
| CN | 109411847 | A | | 3/2019 | |
| CN | 109795300 | A * | | 5/2019 | ............. B60K 11/02 |
| CN | 110015195 | A | | 7/2019 | |
| CN | 110053518 | A | | 7/2019 | |
| CN | 110481271 | A * | | 11/2019 | ......... B60H 1/00278 |
| FR | 2982935 | A1 | | 5/2013 | |
| WO | WO-2019138731 | A1 * | | 7/2019 | ......... B60H 1/00278 |

OTHER PUBLICATIONS

International Search Report of PCT Patent Application No. PCT/CN2019/122551 issued on Sep. 9, 2020.
Invitation to respond to written opinion of SG patent application No. 11202205694Q issued on Apr. 15, 2024.
Search report of SG patent application No. 11202205694Q issued on Apr. 15, 2024.
Written opinion of SG patent application No. 11202205694Q issued on Apr. 15, 2024.

* cited by examiner

ELECTRIC VEHICLE THERMAL MANAGEMENT SYSTEM, BATTERY THERMAL MANAGEMENT METHOD AND ELECTRIC VEHICLE

CROSS REFERENCE TO RELATED APPLICATIONS

This application is a 35 U.S.C. § 371 National Phase conversion of International (PCT) Patent Application No. PCT/CN2019/122551, filed on Dec. 3, 2019. The contents of the above-identified application are incorporated herein by reference. The PCT International Patent Application was filed and published in Chinese.

TECHNICAL FIELD

The present application relates to the technical field of battery thermal management, and in particular, to an electric vehicle thermal management system, a battery thermal management method and an electric vehicle.

BACKGROUND

An electric vehicle is a transportation tool that is powered by on-board power supply to drive the wheels using driving motor. Due to having less impact on the environment compared with the traditional vehicles, the electric vehicle is actively promoted and applied in various fields. As the driving device of pure electric vehicles, the driving motor generates a large amount of heat during operation, and the continuous accumulation of the heat will seriously affect the stability of the driving motor. As the power source of the electric vehicles, the battery will generate heat during charging and discharging. When the battery temperature is too high, it will affect its performance and service life. Especially when the battery is out of control, if it is not effectively controlled, it is easy to cause fire and seriously affect personal safety.

In order to solve the above problems, the traditional solution is to equip the driving motor and the battery with an independent liquid cooling system. In the prior art, when the heat of the battery is out of control, the coolant in the battery liquid cooling system is sprayed onto the battery pack. However, the coolant capacity in the battery liquid cooling system is very limited, and it is often unable to achieve the purpose of fire extinguishing and cooling when the coolant is exhausted. If an additional fire extinguishing system is added, it will occupy a large space of the vehicle and increase the energy consumption of the vehicle, which is not conducive to the lightweight design and cost reduction of the whole vehicle.

In addition, when the electric vehicle operates in winter or severe cold areas, the vehicle charging time becomes longer due to the low battery temperature, while the traditional PTC heating solution has low heating efficiency, high energy consumption and high failure rate.

SUMMARY

An embodiment of the present application provides an electric vehicle thermal management system, a battery thermal management method and an electric vehicle, which can effectively perform thermal management to the battery and the driving motor. When a thermal runaway occurs in the battery, the first heat conducting agent and the second heat conducting agent are released to the battery to cool or extinguish the battery system, so as to improve the safety of the electric vehicle without adding an additional fire extinguishing system and save space for the vehicle.

In order to achieve the above purpose, the embodiment of the present application provides an electric vehicle thermal management system including a first loop, a second loop, a first temperature control mechanism, a second temperature control mechanism, a conveying mechanism and a release mechanism.

The first loop transmits a first heat conducting agent, and a battery and the first temperature control mechanism are respectively connected to the first loop. The second loop transmits a second heat conducting agent, and a driving motor and the second temperature control mechanism are respectively connected to the second loop. The conveying mechanism is respectively connected to the first loop and the second loop. The release mechanism is connected to the first loop. The first loop transmits the first heat conducting agent to the first temperature control mechanism for cooling or heating, and then transmits it to the battery for heat exchange with the battery, and this cycle continues. The second loop transmits the second heat conducting agent to the second temperature control mechanism for cooling or heating, and then transmits it to the driving motor for heat exchange with the driving motor, and this cycle continues. When a thermal runaway occurs in the battery, the conveying mechanism transmits the second heat conducting agent to the first loop, and the release mechanism releases the first heat conducting agent and the second heat conducting agent to the battery through a release port. The first heat conducting agent and the second heat conducting agent include a liquid heat conducting agent.

The first loop includes a first circulating line and a first control device. The first control device is arranged on the first circulating line to control the flow of the first heat conducting agent in the first circulating line. The first control device includes a first switch and a first driving member.

The first loop further includes a first expansion tank. The first expansion tank is connected to the first circulating line. The first expansion tank is stored with the first heat conducting agent. When the volume of the first heat conducting agent in the first circulating line becomes smaller due to evaporation or other reasons, the first heat conducting agent in the first expansion tank enters the first circulating line for compensation. When the volume of the first heat conducting agent in the first circulating line becomes larger due to temperature increase, the first heat conducting agent in the first circulating line enters the first expansion tank to avoid overflow.

The first temperature control mechanism includes a refrigerator.

The second loop includes a second circulating line and a second control device. The second control device is arranged on the second circulating line to control the flow of the second heat conducting agent in the second circulating line. The second control device includes a second driving member and a second switch.

The second loop further includes a second expansion tank. The second expansion tank is connected to the second circulating line. The second expansion tank is stored with the second heat conducting agent. When the volume of the second heat conducting agent in the second circulating line becomes smaller due to evaporation or other reasons, the second heat conducting agent in the second expansion tank enters the second circulating line for compensation. When the volume of the second heat conducting agent in the second circulating line becomes larger due to temperature increase, the second heat conducting agent in the second circulating line enters the second expansion tank to avoid overflow.

The second temperature control mechanism includes a radiator.

The conveying mechanism includes a conveying line and a conveying control device arranged on the conveying line. The outlet end of the conveying line is connected to the first loop, and the inlet end of the conveying line is connected to the second loop. The conveying control device controls the flow of the second heat conducting agent in the conveying line. When a thermal runaway occurs in the battery, the conveying control device is opened, and the second heat conducting agent enters the first loop through the conveying line to converge with the first heat conducting agent. The conveying control device includes a third driving member and a third switch.

The first temperature control mechanism includes a heat exchange apparatus. The heat exchange apparatus is respectively connected to the first loop and the second loop, such that the first heat conducting agent and the second heat conducting agent separately enter the heat exchange apparatus for heat exchange. When the battery temperature is too low, the heat generated by the driving motor can be effectively used to heat the battery, which is efficient and energy-saving.

The heat exchange apparatus includes a heat exchange line, a heat exchanger and a heat exchange control device arranged on the heat exchange line. The heat exchanger includes a first flow passage and a second flow passage, and the first flow passage and the second flow passage are isolated from each other by a heat exchange plate. The first flow passage is connected in series to the first loop, and two ends of the second flow passage are connected to the second loop through the heat exchange line. The heat exchange control device controls the flow of the second heat conducting agent in the heat exchange line. When the battery is in normal state or needs to be cooled down, the heat exchange control device is closed. When the battery needs to be heated, the first heat conducting agent flows into the first flow passage, and the heat exchange control device is opened, such that the heat exchange line is conducted, and the second heat conducting agent flows through the second flow passage after entering the heat exchange line for heat exchange with the first heat conducting agent in the first flow passage. The second heat conducting agent transfers the heat generated by the driving motor to the first heat conducting agent, and the first heat conducting agent after completing the heat exchange is then transmitted to the first loop to heat the battery.

The heat exchange apparatus includes a heat exchange line, a heat exchanger and a heat exchange control device arranged on the heat exchange line. The heat exchanger includes a first flow passage and a second flow passage, and the first flow passage and the second flow passage are isolated from each other by a heat exchange plate. The second flow passage is connected in series to the second loop, and two ends of the first flow passage are connected to the first loop through the heat exchange line. The heat exchange control device controls the flow of the first heat conducting agent in the heat exchange line. When the battery is in normal state or needs to be cooled down, the heat exchange control device is closed. When the battery needs to be heated, the second heat conducting agent flows into the second flow passage, and the heat exchange control device is opened, such that the heat exchange line is conducted, and the first heat conducting agent flows through the first flow passage after entering the heat exchange line for heat exchange with the second heat conducting agent in the second flow passage. The second heat conducting agent transfers the heat generated by the driving motor to the first heat conducting agent, and the first heat conducting agent after completing the heat exchange is then transmitted to the first loop to heat the battery.

The heat exchange control device includes a fourth driving member and a fourth switch.

The release mechanism includes a nozzle and a release switch. The release switch is arranged on the nozzle. The inlet end of the nozzle is connected to the first loop, and the outlet end of the nozzle is provided with the release port. When a thermal runaway occurs in the battery, the release switch is opened, and the first heat conducting agent and the second heat conducting agent are released to the battery through the release port. A spraying device is set on the release port to effectively expand the spraying area.

The embodiment of the present application further provides a battery thermal management method using the above electric vehicle thermal management system. When the battery needs to be cooled, the first loop transmits the first heat conducting agent to the first temperature control mechanism, the first temperature control mechanism cools down the first heat conducting agent, and the first loop transmits the cooled first heat conducting agent to the battery for heat exchange. When a thermal runaway occurs in the battery, the conveying mechanism transmits the second heat conducting agent to the first loop, such that the second heat conducting agent converges with the first heat conducting agent, and the release mechanism releases the first heat conducting agent and the second heat conducting agent that are converged to the battery.

When the battery needs to be heated, the first loop transmits the first heat conducting agent to the first temperature control mechanism, the first temperature control mechanism heats the first heat conducting agent, and the first loop transmits the heated first heat conducting agent to the battery for heat exchange.

The embodiment of the present application further provides an electric vehicle, including the above electric vehicle thermal management system.

The present application provides an electric vehicle thermal management system, a battery thermal management method and an electric vehicle. Compared with the prior art, when a thermal runaway occurs in the battery, the second heat conducting agent for driving motor thermal management and the first heat conducting agent for battery thermal management are released to the battery to prevent the occurrence of fire without adding a fire extinguishing system, so as to save space for the electric vehicle and improve the safety of the electric vehicle. When the temperature of the battery is low, the first heat conducting agent is heated by using the heat generated by the driving motor in operation, and then the first heat conducting agent transfers the heat to the battery to improve the heating efficiency and save energy.

BRIEF DESCRIPTION OF THE DRAWINGS

As shown in FIGS. 1-2: 100—first loop, 110—first circulating line, 120—first control device, 121—first driving member, 122—first switch, 130—first expansion tank, 200—second loop, 210—second circulating line, 220—second control device, 221—second driving member, 222—second switch, 230—second expansion tank, 300—first temperature control mechanism, 310—refrigerator, 320—heat exchange apparatus, 321—heat exchange line, 322—heat exchanger, 3221—first flow passage, 3222—second flow passage, 323—heat exchange control device, 3231—fourth driving member, 3232—fourth switch, 400—second temperature control mechanism, 500—conveying mechanism, 510—conveying line, 520—conveying control device, 521—third driving member, 522—third switch, 600—release mechanism, 610—nozzle, 620—release switch, 700—battery, 710—liquid cooling plate, 800—driving motor.

DETAILED DESCRIPTION OF PREFERRED EMBODIMENTS

In order to make the above objects, features and advantages of the present application clear and easy to understand, specific embodiments of the present application are described in detail below.

First Embodiment

Figure 1:
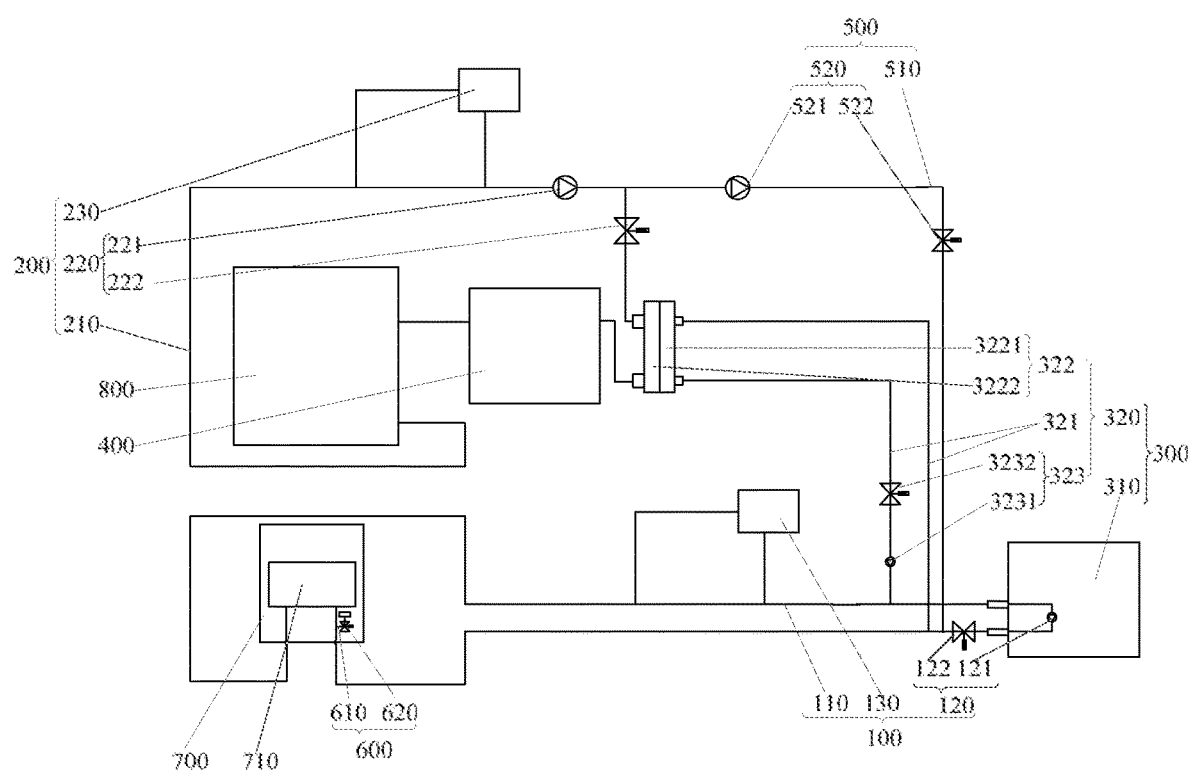
FIG. 1 is a structural diagram of an electric vehicle thermal management system provided by a first embodiment of the present application.

This embodiment provides an electric vehicle thermal management system, as shown in FIG. 1, including a first loop 100, a second loop 200, a first temperature control mechanism 300, a second temperature control mechanism 400, a conveying mechanism 500 and a release mechanism 600.

Further, the first loop 100 includes a first circulating line 110, a first control device 120 and a first expansion tank 130. The first control device 120 and the first expansion tank 130 are respectively connected to the first circulating line 110. The first control device 120 is used to control the flow of a first heat conducting agent in the first circulating line 110. The first temperature control mechanism 300 includes a refrigerator 310 and a heat exchange apparatus 320. The refrigerator 310, the heat exchange apparatus 320 and a battery 700 are respectively connected to the first circulating line 110. The first control device 120 includes a first driving member 121 and a first switch 122. The first driving member 121 drives the flow of the first heat conducting agent. When the first switch 122 is opened, the first heat conducting agent circulates in the first circulating line 110. When the first switch 122 is closed, the flow of the first heat conducting agent is interrupted.

Further, the heat exchange apparatus 320 includes a heat exchange line 321, a heat exchanger 322, and a heat exchange control device 323 arranged on the heat exchange line 321. The heat exchanger 322 includes a first flow passage 3221 and a second flow passage 3222. The first flow passage 3221 and the second flow passage 3222 are isolated from each other by a heat exchange plate (not labelled). The second flow passage 3222 is connected in series to the second loop 200. The inlet end and the outlet end of the heat exchange line 321 are respectively connected to the first circulating line 110, and the first flow passage 3221 is connected in series to the heat exchange line 321. The heat exchange control device 323 controls the flow of the first heat conducting agent in the heat exchange line 321. The heat exchange control device 323 includes a fourth driving member 3231 and a fourth switch 3232. The fourth driving member 3231 and the fourth switch 3232 are arranged between the inlet end of the heat exchange line 321 and the first flow passage 3221. Driven by the fourth driving member 3231, the first heat conducting agent can enter the heat exchange line 321. When the fourth switch 3232 is opened, the first heat conducting agent enters the first flow passage 3221 and then flows back to the first circulating line 110 from the outlet end of the heat exchange line 321. When the fourth switch 3232 is closed, the first heat conducting agent cannot enter the first flow passage 3221 through the heat exchange line 321. Specifically, in this embodiment, as shown in FIG. 1, the refrigerator 310 is connected to the first circulating line 110 and is arranged between the inlet end of the heat exchange line 321 and the outlet end of the heat exchange line 321. The first switch 122 is connected to the first circulating line 110 and is arranged between the refrigerator 310 and the outlet end of the heat exchange line 321.

The second loop 200 includes a second circulating line 210, a second control device 220 and a second expansion tank 230. The second control device 220 is arranged on the second circulating line 210 to control the flow of a second heat conducting agent in the second circulating line 210. The second temperature control mechanism 400 uses a radiator. A driving motor 800 and the second temperature control mechanism 400 are respectively connected to the second circulating line 210. The second control device 220 includes a second driving member 221 and a second switch 222. The second driving member 221 drives the flow of the second heat conducting agent. When the second switch 222 is opened, the second heat conducting agent circulates in the second circulating line 210. When the second switch 222 is closed, the flow of the second heat conducting agent is interrupted. The first heat conducting agent and the second heat conducting agent in this embodiment both use water. The use of the expansion tank is a common general knowledge in the art. Therefore, the installations of the first expansion tank 130 and the second expansion tank 230 are not further described in this embodiment.

The conveying mechanism 500 includes a conveying line 510 and a conveying control device 520 arranged on the conveying line 510. The outlet end of the conveying line 510 is connected to the first circulating line 110, and the inlet end of the conveying line 510 is connected to the second circulating line 210. The second heat conducting agent can enter the first circulating line 110 through the conveying line 510, and the conveying control device 520 controls the flow of the second heat conducting agent in the conveying line 510. The conveying control device 520 includes a third driving member 521 and a third switch 522. When the third switch 522 is opened, the second heat conducting agent is driven by the third driving member 521 to enter the conveying line 510 and flows into the first circulating line 110 from the outlet end of the conveying line 510.

In this embodiment, the first driving member 121, the second driving member 221, the third driving member 521 and the fourth driving member 3231 all use water pumps, and the first switch 122, the second switch 222, the third switch 522 and the fourth switch 3232 all use solenoid valves. During the specific installation, the second driving member 221 and the third driving member 521 can also be combined into the same water pump, that is, one water pump is used to control the second circulating line 210 and the conveying line 510 at the same time, so as to make the structure of the whole system more compact and save space.

The release mechanism 600 includes a nozzle 610 and a release switch 620, the release switch 620 is arranged on the nozzle 610, the inlet end of the nozzle 610 is connected to the first circulating line 110, and the outlet end of the nozzle 610 is provided with a release port (not labelled). In this embodiment, a spraying device (not shown) can be arranged on the release port to increase the spraying area. When a thermal runaway occurs in the battery, the release switch 620 is opened, and the first heat conducting agent and the second heat conducting agent are released to the battery 700 through the spraying device.

As shown in FIG. 1, the working principle of the electric vehicle thermal management system provided by the present application is as follows:

When the battery 700 needs to be cooled, the first switch 122 is opened, the third switch 522 and the fourth switch 3232 are closed, and the first heat conducting agent is driven by the first driving member 121 to flow through the first circulating line 110. The first heat conducting agent is firstly cooled down through the refrigerator 310, and then passes through a liquid cooling plate 710 of the battery 700 for heat exchange with the battery 700, the heat of the battery 700 is transferred to the first heat conducting agent, and the first heat conducting agent that completes the heat exchange enters the refrigerator 310 for cooling again. This cycle continues until the battery 700 returns to normal.

When the driving motor 800 needs to be cooled, the second switch 222 is opened, and the second heat conducting agent is driven by the second driving member 221 to flow through the second circulating line 210. The second heat conducting agent is firstly cooled down through the radiator, and then passes through the driving motor 800 and exchanges heat with the driving motor 800, whereby the driving motor 800 transfers heat to the second heat conducting agent. This cycle continues until the driving motor 800 returns to normal.

When a thermal runaway occurs in the battery 700, the first switch 122 and the third switch 522 are opened, the fourth switch 3232 and the second switch 222 are closed, the second heat conducting agent in the second circulating line 210 is driven by the third driving member 521 to enter the conveying line 510, and then enters the first circulating line 110 from the outlet end of the conveying line 510, such that the first heat conducting agent and the second heat conducting agent converge, the release switch 620 is opened, and the first heat conducting agent and the second heat conducting agent are sprayed on the battery 700 through the spraying device so as to effectively prevent the occurrence of fire.

When the battery 700 needs to be heated up, the refrigerator 310 is turned off, the first switch 122 and the third switch 522 are closed, the second switch 222 and the fourth switch 3232 are opened, and the first heat conducting agent is driven by the fourth driving member 3231 to enter the heat exchange line 321 and flows through the first flow passage 3221. Meanwhile, the second heat conducting agent flows through the second flow passage 3222, the second heat conducting agent transfers the heat of the driving motor 800 to the first heat conducting agent, and the first heat conducting agent that completes the heat exchange enters the first circulating line 110 to heat the battery 700. This cycle continues until the battery 700 returns to normal.

Second Embodiment

Figure 2:
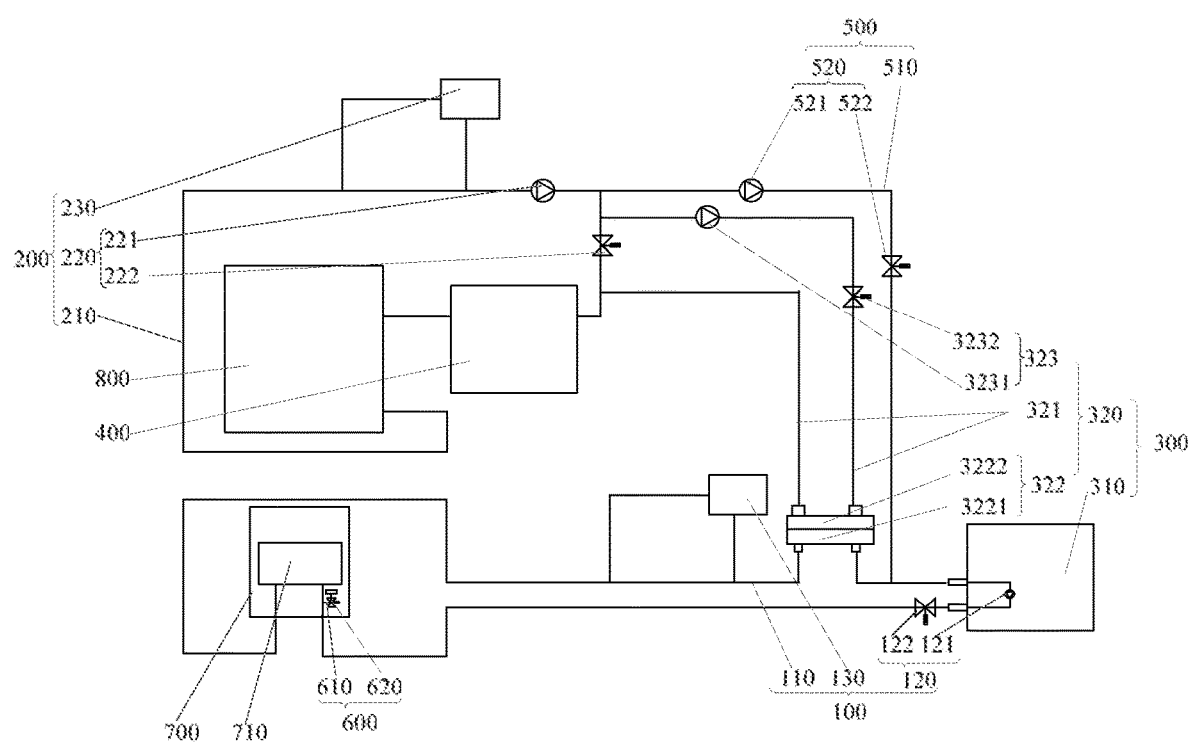
FIG. 2 is a structural diagram of an electric vehicle thermal management system provided by a second embodiment of the present application.

As shown in FIG. 2, the difference from the first embodiment is that the first flow passage 3221 in this embodiment is connected in series to the first loop 100, the inlet end and the outlet end of the heat exchange line 321 are respectively connected to the second circulating line 210, the second flow passage 3222 is connected in series to the heat exchange line 321, and the fourth driving member 3231 and the fourth switch 3232 are arranged between the inlet end of the heat exchange line 321 and the second flow passage 3222. Driven by the fourth driving member 3231, the second heat conducting agent can enter the heat exchange line 321. When the fourth switch 3232 is opened, the second heat conducting agent enters the second flow passage 3222 and flows back to the second circulating line 210 from the outlet end of the heat exchange line 321. When the fourth switch 3232 is closed, the second heat conducting agent cannot enter the second flow passage 3222 through the heat exchange line 321.

What is claimed is:

1. An electric vehicle thermal management system, comprising:
a first loop, a second loop, a first temperature control mechanism, a second temperature control mechanism, a conveying mechanism and a release mechanism;
wherein the first loop is configured for transmitting a first heat conducting agent, a battery and the first temperature control mechanism are respectively connected to the first loop, and the first loop transmits the first heat conducting agent to circulate between the first temperature control mechanism and the battery;
the second loop is configured for transmitting a second heat conducting agent, a driving motor and the second temperature control mechanism are respectively connected to the second loop, and the second loop transmits the second heat conducting agent to circulate between the second temperature control mechanism and the driving motor;
the conveying mechanism is respectively connected to the first loop and the second loop;
the release mechanism is connected to the first loop, and a release port of the release mechanism faces the battery.

2. The electric vehicle thermal management system according to claim 1, wherein the first loop comprises a first circulating line and a first control device, and the first control device is arranged on the first circulating line.

3. The electric vehicle thermal management system according to claim 2, wherein the first loop further comprises a first expansion tank, and the first expansion tank is connected to the first circulating line.

4. The electric vehicle thermal management system according to claim 2, wherein the first control device comprises a first switch and a first driving member.

5. The electric vehicle thermal management system according to claim 1, wherein the first temperature control mechanism comprises a refrigerator.

6. The electric vehicle thermal management system according to claim 1, wherein the second loop comprises a second circulating line and a second control device, and the second control device is arranged on the second circulating line.

7. The electric vehicle thermal management system according to claim 6, wherein the second control device comprises a second switch and a second driving member.

8. The electric vehicle thermal management system according to claim 6, wherein the second loop further comprises a second expansion tank, and the second expansion tank is connected to the second circulating line.

9. The electric vehicle thermal management system according to claim 1, wherein the second temperature control mechanism comprises a radiator.

10. The electric vehicle thermal management system according to claim 1, wherein the conveying mechanism comprises a conveying line and a conveying control device arranged on the conveying line, an outlet end of the conveying line is connected to the first loop, and an inlet end of the conveying line is connected to the second loop.

11. The electric vehicle heat management system according to claim 1, wherein the first temperature control mechanism comprises a beat exchange apparatus, the heat exchange apparatus is respectively connected to the first loop and the second loop, such that the first heat conducting agent and the second heat conducting agent enter the heat exchange apparatus for heat exchange.

12. The electric vehicle heat management system according to claim 11, wherein the heat exchange apparatus comprises a heat exchange line, a heat exchanger and a heat exchange control device arranged on the heat exchange line, the heat exchanger comprises a first flow passage and a second flow passage, and the first flow passage and the second flow passage are isolated from each other by a heat exchange plate; the first flow passage is connected in series to the first loop; two ends of the second flow passage are connected to the second loop through the heat exchange line, and the heat exchange control device controls the flow of the second heat conducting agent in the heat exchange line.

13. The electric vehicle heat management system according to claim 11, wherein the heat exchange apparatus comprises a heat exchange line, a heat exchanger and a heat exchange control device arranged on the heat exchange line, the heat exchanger comprises a first flow passage and a second flow passage, and the first flow passage and the second flow passage are isolated by a heat exchange plate; the second flow passage is connected in series to the second loop; two ends of the first flow passage are connected to the first loop through the heat exchange line, and the heat exchange control device controls the flow of the first heat conducting agent in the heat exchange line.

14. The electric vehicle thermal management system according to claim 1, wherein the release mechanism comprises a nozzle and a release switch, the release switch is arranged on the nozzle, an inlet end of the nozzle is connected to the first loop, and an outlet end is provided with the release port.

15. A battery thermal management method using the electric vehicle thermal management system according to claim 1, comprising:
- the first loop transmits the first heat conducting agent to the first temperature control mechanism, and the first temperature control mechanism cools down the first heat conducting agent, the first loop transmits the cooled first heat conducting agent to the battery for heat exchange to cool the battery;
- the conveying mechanism transmits the second beat conducting agent to the first loop, such that the second heat conducting agent converges with the first heat conducting agent, and the release mechanism releases the first heat conducting agent and the second heat conducting agent that are converged to the battery for occurrence of a thermal runaway in the battery.

16. The battery thermal management method according to claim 15, further comprising:
- the first loop transmits the first heat conducting agent to the first temperature control mechanism, the first temperature control mechanism heats the first heat conducting agent, and the first loop transmits the heated first heat conducting agent to the battery for heat exchange to heat the battery.

17. An electric vehicle comprising the electric vehicle thermal management system according to claim 1.

* * * * *